(No Model.) 2 Sheets—Sheet 1.

F. M. SCHMIDT.
ELECTROMAGNETIC MOTOR.

No. 560,652. Patented May 26, 1896.

Witnesses:
Raphaël Netter
Jessie B. Kay

Frederick M. Schmidt, Inventor
by Parker W. Page, Att'y.

(No Model.) 2 Sheets—Sheet 2.

F. M. SCHMIDT.
ELECTROMAGNETIC MOTOR.

No. 560,652. Patented May 26, 1896.

Witnesses:
Raphaël Netter
Jessie B. Kay.

Frederick M. Schmidt, Inventor
by Parker W. Page, Att'y.

UNITED STATES PATENT OFFICE.

FREDERICK M. SCHMIDT, OF BROOKLYN, NEW YORK.

ELECTROMAGNETIC MOTOR.

SPECIFICATION forming part of Letters Patent No. 560,652, dated May 26, 1896.

Application filed January 18, 1896. Serial No. 576,033. (No model.)

*To all whom it may concern:*

Be it known that I, FREDERICK M. SCHMIDT, a citizen of the United States, residing at Brooklyn, in the county of Kings and State of New York, have invented certain new and useful Improvements in Electromagnetic Motors, of which the following is a specification, reference being had to the drawings accompanying and forming a part of the same.

My present invention has for its object to provide for the rotation of certain devices—such as fly-fans, turn-tables for exhibiting goods, and the like, which, while possessing considerable inertia, require but a small expenditure of power to maintain them in comparatively slow rotation—an electromagnetic-motive device which shall effect the desired result with the least possible expenditure and waste of energy. The apparatus which accomplishes this purpose and which, only after many experiments, I have succeeded in producing, while involving no broadly new principles of construction or mode of operation, is characterized by several novel features and details which are apparently essential to the full attainment of its intended object and fulfil the main requirements of an apparatus of this kind in being capable of running for an indefinite period without material wear and of consuming in operation but a very small amount of electrical energy.

I have illustrated the device in the accompanying drawings as applied to a portable fly-fan; but it will be understood that without material change in the combination of parts comprising the motive device it may be applied to other like devices, such as above indicated.

Figure 1:
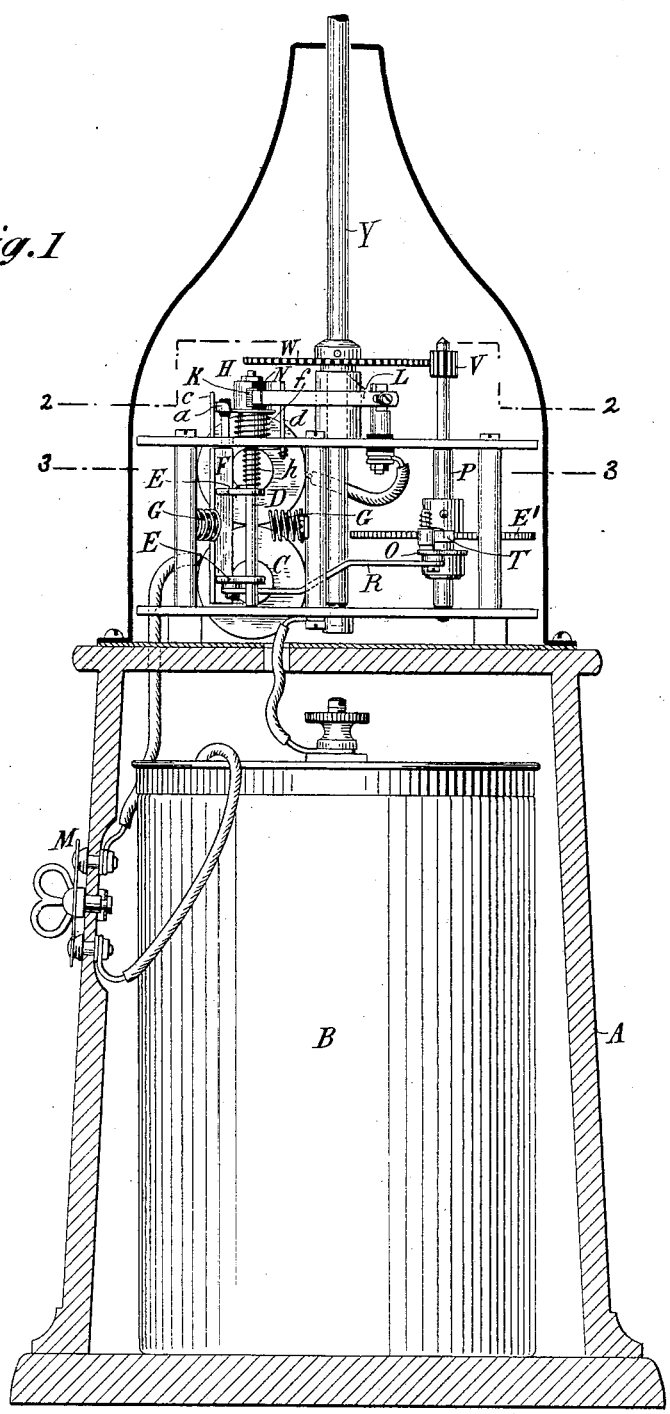
Figure 2:
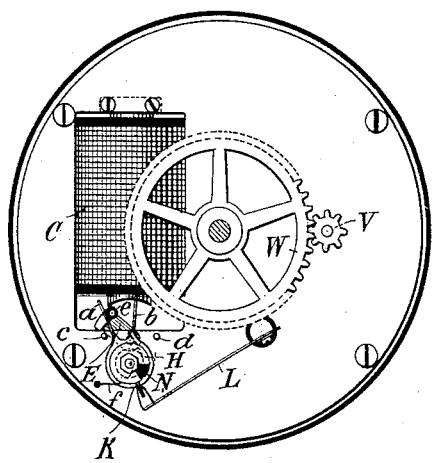
Figure 3:
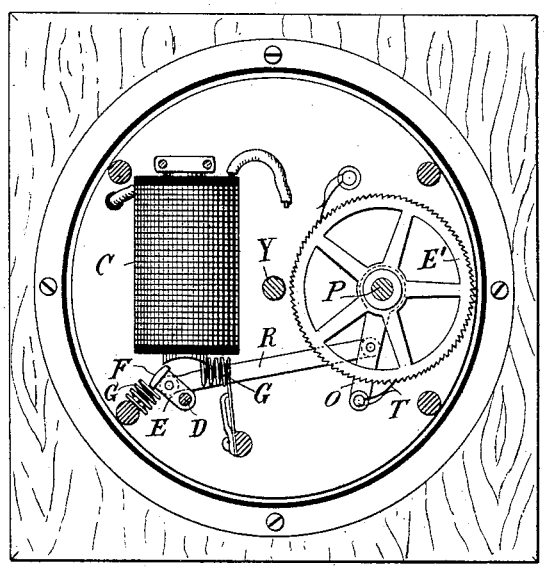

Figure 1 is a view in side elevation of the device mounted and arranged for operation, the casings being in section and the vanes or fan being omitted for convenience. Fig. 2 is a broken section on line 2 2 of Fig. 1. Fig. 3 is a horizontal section on line 3 3 of Fig. 1.

The motor proper is mounted on a suitable box or case A, which contains a primary or secondary battery B, preferably the former, as I have found that with primary batteries now on the market I may run a fly-fan continuously for six hundred hours at an expense of twenty cents.

The motor comprises an electromagnet C, the pole-faces of the cores of which conform to an arc of a circle, as shown in Figs. 2 and 3. In the face of these poles is mounted a spindle D, carrying, by horizontal arms E, an armature F, the side of which presented to the poles corresponds to their curvature. The oscillation of the armature is limited in extent by two spiral-spring buffers G, which serve also to deaden the sound of impact of the armature at its extremes of movement. On a stud set in the upper plate of the frame containing the motor apparatus is a contact-ring H, from which two arms $a$ $b$ extend outwardly between two stop-pins $c$ $d$, set in said plate, so as to limit the movement of ring H about its axis. An insulating-pin $e$, carried by the armature F, projects up between the arms $a$ $b$, and by engagement therewith alternately shifts the ring H from one to the other of its extremes of movement. A spiral wire $f$, interposed between the upper plate and the ring H and surrounding the stud upon which said ring turns, maintains good electrical connection between the ring and the frame or plate, which would otherwise be impaired by oil used as a lubricant.

A spiral spring $h$, surrounding the spindle D and connected by its two ends to the arm E and the frame of the device, respectively, imparts to the spindle and armature a tendency to assume the position in which these parts are shown in the drawings. In this position a small wire brush K, carried by a spring-arm L and insulated from the frame, bears upon a metallic portion of the periphery of the ring H.

The poles of the battery B are connected by wires controlled by a switch M to the frame and to the insulated spring-arm L, respectively, the latter connection being made through the coils of the electromagnet C. Hence if the switch be closed the magnet is energized and the armature attracted over toward the poles. Before reaching the normal position which it tends to assume under the attractive influence of the magnet the armature, by means of the insulating-pin $e$, turns the ring $h$ by encountering the arm $b$ so as to bring the brush K onto a segment of insulation N, forming part of the ring H. This interrupts the circuit and permits the armature to return toward its initial position, just before reaching which it turns the ring back by engaging with the arm a, and the above operation is repeated. So long as the battery is switched in the armature oscillates, the special arrangement of commutator providing for a full swing of the armature with positive forward movement and return under the influence of its retractile spring. This movement of the armature is utilized in the following manner: An arm O, turning freely on a spindle P, is connected to the armature or one of its arms E by a link R and oscillates in unison with the armature. A ratchet-wheel E′ with fine teeth is mounted on the spindle P and is actuated by a pawl T, composed of a light blade of resilient metal fixed to and carried by the arm O. The motion of the spindle P is transmitted by a pinion V to a cog-wheel W on the spindle Y, which carries the vanes or fan. By using a pawl of the kind described the throw of the pawl does not require adjustment, as the flexible and resilient character of the pawl compensates for any wear that may occur. The comparatively feeble oscillatory movement of the armature is thus converted into rotary movement and reduced by the gears, so as to be utilized for the useful purpose described. I have found that an apparatus thus constructed will run for a very long period without appreciable wear, with very small consumption of battery-power and without adjustment or attention.

What I claim as my invention is—

1. The combination with the driving-spindle of a fly-fan or other like device of the kind described of an armature of comparatively feeble power mounted to oscillate in the face of the poles of an electromagnet between spring-buffers which limit its swing, a commutator shifted by the armature at points near the extremes of its movement, a ratchet and pawl for converting the oscillating motion of the armature into rotary motion, and reducing-gears between the ratchet and the fan-spindle, whereby a slow and practically continuous movement of the fan is maintained.

2. The combination with the spindle of a fly-fan or like device, of an electromagnet, an armature mounted to oscillate in front of its poles, a metal ring with an insulating-segment capable of partial rotation, and having two arms projecting on opposite sides of the armature or a pin thereon, a brush bearing on the ring, and adapted in the movement of the armature to make and break the circuit through the magnet, a pawl operated by the armature, and a train of reducing-gears connected with the fan-spindle and rotated by the pawl.

In testimony whereof I have hereunto set my hand this 14th day of January, 1896.

FREDERICK M. SCHMIDT.

Witnesses:
ROBT. F. GAYLORD,
PARKER W. PAGE.